United States Patent [19]
Sparlin et al.

[11] Patent Number: 5,450,898
[45] Date of Patent: Sep. 19, 1995

[54] GRAVITY ENHANCED MAINTENANCE SCREEN

[76] Inventors: Derry D. Sparlin, 9803 Oxted La., Spring, Tex. 77379; Tadayoshi Nagaoka, No. 2-2-91, Mokuzaidouri Mihara-Cho, Minamikawachi-gun, Osaka, Japan, 587

[21] Appl. No.: 243,513

[22] Filed: May 12, 1994

[51] Int. Cl.⁶ ................................ E21B 43/00
[52] U.S. Cl. .................................... 166/227
[58] Field of Search ................. 166/226–236

[56] References Cited
U.S. PATENT DOCUMENTS

| | | | |
|---|---|---|---|
| 4,624,319 | 11/1986 | van der Borght | 166/227 X |
| 4,771,829 | 9/1988 | Sparlin | 166/233 |
| 5,095,990 | 3/1992 | Best et al. | 166/227 X |

*Primary Examiner*—Michael Powell Buiz
*Attorney, Agent, or Firm*—Bernard A. Reiter; Mark L. Berrier

[57] ABSTRACT

A maintenance screen for use in low-velocity, shallow or horizontal or slightly inclined wells is disclosed. The maintenance screen of the present invention utilizes a generally downwardly oriented portion through which fluid can pass and a generally upwardly oriented portion which does not allow sand or fluid to pass therethrough, so that sand naturally gravitates downward through the fluid and away from the portion of the screen through which the fluid may pass to enter the well tubing.

10 Claims, 1 Drawing Sheet

GRAVITY ENHANCED MAINTENANCE SCREEN

BACKGROUND OF THE INVENTION

1. Field of the Invention

This invention relates generally to the field of oil well, gas well, water well and subterranean pollution remediation well equipment, and more particularly to downhole screen and more particularly to downhole screens whose design and use are directed to relatively shallow wells, primarily wells which are shallow and/or substantially horizontal or very slightly inclined. A function of such screens is to filter sand and undesirable solids and toxic extractions from fluids and gases in subterranean locations.

2. Brief Description of the Prior Art

A. Sand production is a major problem which has plagued the petroleum industry for many years, as it plagued the water well industry long before men began drilling for oil. The petroleum industry spends millions of dollars annually cleaning sand out of wells, repairing problems related to sand production and loses additional millions of dollars by the resultant restricted production rates.

The production of sand continues to be a worldwide problem. Areas of major problems include not only the United States, the Gulf Coast, California, Canada and the North Sea, but also Europe, China and South America. Unchecked production of sand is very expensive in terms of additional operating expenses, loss revenues, and creation of potentially hazardous situations. Some of the specific problems associated with sand production are as follows:

1. Sand filled and bridges inside the hole, casing or tubing which reduces or shuts off production.
2. Erosion damage to downhole tubulars and equipment including safety valves, chokes and artificial lift equipment.
3. Sand accumulation in surface lines and equipment.
4. Creation of void spaces behind casing leaving the casing unsupported and subject to buckling.
5. Abrasive wear on surface controls, valves and pipes.
6. Increased compressive loading on the casing or liner as subsidence occurs, ultimately causing the casing to either buckle or collapse.
7. Additional expenses associated with sand production include clean out and proper disposal of sand and work over costs to return wells to production.
8. The loss revenue due to restricted or completely shut-in production is often a "hidden" expense which is not always considered.

Obviously, the results of sand production can be extremely expensive if it causes or creates a major setback such as a well blowout or a platform fire.

The production of sand in oil and gas wells is therefore expensive and everything possible is done to successfully control the formation of sand. The goal of all sand control treatment therefore is to stop sand production while maintaining or maximizing fluid production. Thus the success or failure of a sand control treatment must be measured against three interrelated criteria:

1. Stop sand movement and production of sand.
2. Maintain maximum well productivity.
3. Payout the treatment costs within a reasonable time.

Most of the early research work done by the petroleum industry has been directed at a means of controlling sand using the largest practical sizes of gravels and liners with the notion that this would also provide the highest production rates. Research efforts over the years have been aimed at complete stoppage of formation sand while maintaining maximum fluid production and at gravel packing high angle and horizontal wells. The methods for controlling formation of sands can be generally classified as either mechanical, chemical, or combination of mechanical/chemical. The mechanical methods of sand control prevent sand production by stopping the formation of sand with lines, screens or gravel packs.

B. Many types of screen and filtering devices or well liners are known in the prior art that are designed to exclude sand and other solids from fluids and gases produced from oil, gas, water and pollution remediation wells without undue restriction of the production rate of fluids or gases. Well liners are sometimes used as the sole means of filtering sand from the fluids wherein the screen openings are sized to stop the movement of the formation sand and allow continual flow of fluid into the wellbore. Gravel or other particulate matter is also used in conjunction with screens such as "gravel pack" well liners wherein the gravel or particulates are sized to restrain movement of the formation sand and the screen openings are designed to restrain the movement of the gravel or particulates to allow continual flow of fluids therethrough.

Common well liners employ a base pipe having a plurality of openings through the sidewall which is surrounded by longitudinally extending spacer bars, rods, or rings and over which a continuous wire is wrapped in a carefully spaced spiral configuration to provide a predetermined constant gap between the wire wrapping. The gap allows fluids to flow through the wire wrapping and retains the movement of particulate materials such as sand or gravel. Such a well liner is also commonly referred to as a "wire wrapped" screen.

Most "wire wrapped" well liners have the common feature of an "inner annulus" or space between the base pipe and the wire wrapping. The inner annulus is desirable because it allows free transmission of fluids that flow through the wire wrapping gaps into the apertures on the base pipe. The absence of the inner annulus would significantly restrict fluid flow rates radially into the well liner.

The inner annulus in a wire wrapped well liner causes several serious problems during installation of a gravel pack and the stimulation of a well liner or gravel packed well. Problems occur in bypassing fluid through the inner annulus as the gravel is being transported down the "outer annulus", or the gap between the well liner and the wellbore, and bypassing fluid being injected from a well liner through a gravel pack into the formation to stimulate the well or seal a portion of the wellbore.

Bridges of gravel are in part created, or enhanced, as the gravel carrying fluid flows into the inner annulus. As the gravel carrying fluid moves, an increase of gravel concentration in the fluid in the outer annulus results because the gravel is restricted from entering the wire wrapped well liner but fluid enters freely. Thus, when the gravel concentration increases beyond a critical magnitude, a bridge is formed which wedges in the outer annulus and halts further movement of gravel before the outer annulus is fully packed with gravel.

Another problem results from the fluid freely entering the inner annulus from the outer annulus during gravel packing in highly deviated wellbores. The problem is commonly referred to as "duning". In wellbores having angles of 45 degrees to 90 degrees plus from the vertical, and especially those requiring the gravel to be packed along intervals ranging from several feet to more than a thousand feet, the gravel tends to fall to the low side of the wellbore due to gravity as it is being transported by the fluid. As gravel accumulates, the fluid is diverted to the high side of the wellbore and into the well liner, thereby reducing the velocity of carrier fluid in the outer annulus and the capability of the fluid to force gravel toward the bottom end of the wellbore.

The present invention however is directed to different circumstances, namely where there exists horizontal and/or near horizontal wells. In these types of screens, the top of the screen necessarily remains solid, i.e. it is without preparation, holes, apertures, other screen structure. Only the lower half, or less, of the screen is actively designed to perform a screening function. In this way the solid upper half of the structure restricts gravel and other material from falling to the low side of the wellbore due to gravity.

Thus the thrust of the present invention resides in a screen to be used in a cased hole horizontal wellbore perforated only on the bottom of the casing. The blank, or sealed portion of the screen is oriented toward the perforated side of the casing thereby protecting the screen from erosion by direct flow of produced fluids. Gravity will force gravel or sand to the opposite side of the casing and help pack the gravel or sand. This will reduce the tendency of the sand to be produced into the screen openings, as shown hereafter.

No known art deals with shallow and/or substantially horizontal wells for removing pollutants in the same manner as described herein. Despite the fact that a substantial volume of patented technology exists in the field of downhole screens. Attention may be directed to the earlier patent of Sparlin, U.S. Pat. No. 4,771,829 and to the patents identified therein and to the related prior art, none of which appear to provide for a downhole screen particularly utilized for shallow wells and/or near horizontal wells.

SUMMARY OF THE INVENTION

The present invention is directed to a screen to be used in a cased hole horizontal wellbore or near horizontal wellbore that is perforated only on one side. The blank, or sealed portion of the screen, is oriented toward the perforated side of the casing, thereby protecting the screen from erosion by direct flow of produced fluids. Gravity forces gravel or sand to the opposite side of the casing so as to help pack the gravel or sand adjacent thereto. In this manner, there is less tendency for sands to be produced into the screen openings thus resulting in enhanced production and substantial savings over a period of time.

It is therefore an object of the present invention to provide for an improved screen for horizontal or near horizontal wells.

A further object of the invention is to provide a well liner that is characterized by a solid upper section and a perforated lower section, of unitary design.

A still further feature and advantage of the invention resides in a well liner for shallow wells comprising a solid upper section and a perforated lower section which is simple in construction, economical to manufacture, and durable in use.

These and numerous other features and advantages of the invention will be readily understood upon a careful reading of the following specification, claims and drawings wherein like numerals denote like parts in the several views and wherein:

DETAILED DESCRIPTION OF THE DRAWINGS

DETAILED DESCRIPTION OF THE INVENTION

Figure 1:
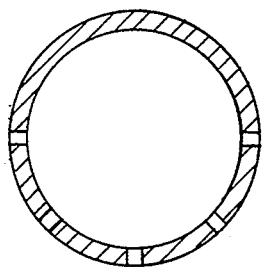
FIG. 1 illustrates, in cross section, a screen form of the invention showing a simple pipe with holes in the lower portion thereof of sufficient size to obstruct sand of predetermined size.
Figure 2:
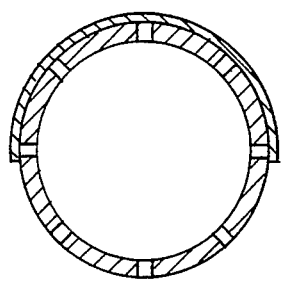
FIG. 2 shows another screen form of the invention characterized by holes disposed about the circumference thereof but on which there exists a fixed outer plate covering approximately one-half ($\frac{1}{2}$) or more of the circumference thereof so as to seal the holes there beneath.
Figure 3:
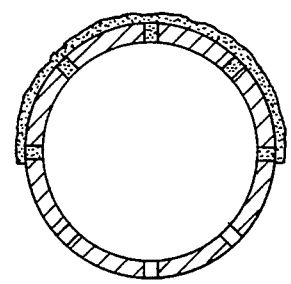
FIG. 3 is another screen form of the invention in which there exists holes throughout the circumference thereof but in which there exists a sealant covering substantially one-half ($\frac{1}{2}$), more or less, of the circumference thereof.

Referring to the drawings by numerals of reference, there is shown in all of the drawings a well liner, commonly referred to as "screen" according to the prior art. Such prior art well liners not uncommonly employ a base pipe or similar structure for performing various functions. The base pipe may, for example, constitute a structural support member for other components of the screen. A base pipe may also serve a part of the screen function itself such as for example when it is characterized by a plurality of holes extending there through. Commonly the base pipe is characterized by such plurality of holes for facilitating the screening function and wherein the holes extend from the interior to the exterior of the pipe base and about the circumference thereof. Such pipe bases are not to be excluded from the teachings of this invention merely because such teachings may oblige the use of such holes only through a portion of the circumference of the pipe base, such as for example through one-half ($\frac{1}{2}$) of the circumference, more or less, namely the "bottom" portion. In such event, the pipe base will be characterized by an outer plate (FIG. 2) or a sealant (FIG. 3) extending around the "upper" portion of the pipe base so as to close off the holes extending through the "upper" portion circumference. Similarly it will be recognized that the plate of FIG. 2 could reside interiorly of the pipe base and function there-at in the same manner.

Figure 4:
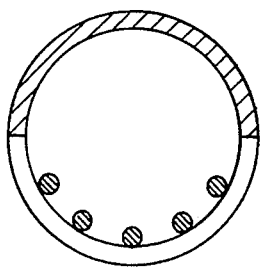
FIG. 4 shows yet another form of the invention in which there is illustrated a screen having a lower portion constructed of wire wraps, helical in pattern, resting on and welded to longitudinal support rods and an upper portion constructed of a solid pipe structurally affixed to the lower portion so as to form an integral screen.
Figure 5:
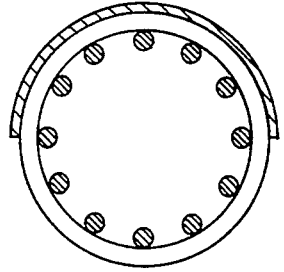
FIG. 5 is yet another form of the filter of the invention in which the screen is constructed of wire wrapped, helically wound, supported on elongate rods and wherein the upper portion is characterized by an outer plate covering, one-half ($\frac{1}{2}$) of the circumference, more or less.
Figure 6:
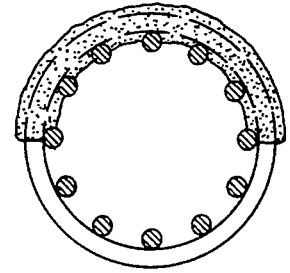
FIG. 6 is yet another form of the inventive screen in which there exists a wire wrapping, helical in form, supported on elongate pipes and in which the outer surface thereof is characterized by a sealant precluding communication of sand through the screen.
Figure 7:
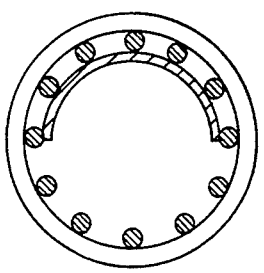
FIG. 7 is another form of the invention characterized by a wire wrap, helical in form, supported on a plurality of elongate pipes and having a plate disposed interiorly of the rods and extending throughout approximately one-half ($\frac{1}{2}$) the circumference of the screen, more or less.

The inventive concept may likewise be practiced in a wire wrapped screen resting on support rods (FIG. 4) and in which the wire wraps characterize the lower portion of the screen circumference while the upper portion of the screen circumference is characterized by a pipe base. Here the pipe base and the wire wrapped screen together cooperate to form the circumference in its entirety. Similarly the support rods may be arranged in parallel fashion to support a wire wrap screen helically wound about the entire circumference and thus to support a plate or pipe base exteriorly (or interiorly) extending around the upper portion of the screen (FIG. 5); or the rods may reside interiorly of a circumferential helical wire wrap having a sealant across the upper portion of the screen (FIG. 6). Or as shown in FIG. 8 there may exist a plurality of support rods having an exterior wire wrap thereabout and a plate disposed interiorly of the support rods and extending about the upper half, more or less, of the circumference of the screen (FIG. 7).

Figure 8:
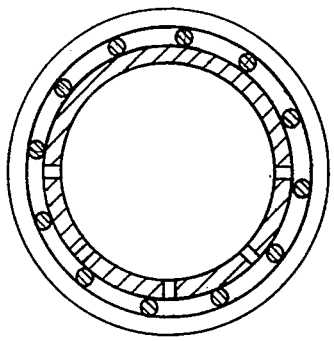
FIG. 8 illustrates yet another form of the invention characterized by a pipe base having holes extending through substantially one-half ($\frac{1}{2}$) the circumference thereof and having elongate rods supported circumferentially parallel to the axis and wire helically wound about the circumference thereof.
Figure 9:
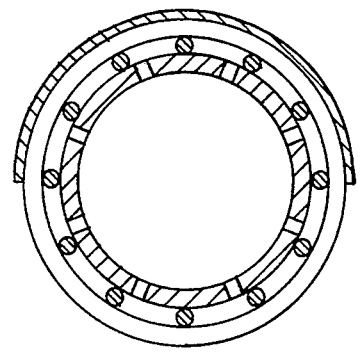
FIG. 9 illustrates a pipe base having holes extending there through and about the circumference thereof and having further elongate rods disposed thereon with a plate extending across approximately one-half ($\frac{1}{2}$) of the circumference thereof, more or less.

In still another form of the invention there exists a pipe base having a plurality of holes extending there through the lower portion thereof (FIG. 8). Here a plurality of rods reside exteriorly of the pipe base extending parallel to the axis thereof and on which there resides a wire wrap. Here the pipe base is absent the holes in the upper portion thereof. Similarly in FIG. 9 there is shown a pipe base having holes extending there through about the circumference thereof and having a plurality of elongate rods disposed circumferentially so as to support a helical wire wrap thereon. A plate resides on the helical wire wrap about the upper portion thereof extending about the circumference, more or less throughout one-half ($\frac{1}{2}$) thereof at the upper portion.

Figure 10:
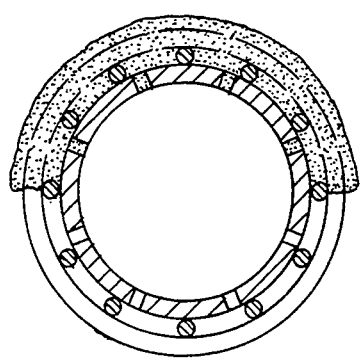
FIG. 10 is a pipe base having holes extending there through about the circumference thereof and a plurality of rods axially aligned in parallel fashion along the length of the pipe base with a wire wrap constructed thereon and having a sealant extending over approximately one-half ($\frac{1}{2}$) of the circumference of the screen, more or less.

And in FIG. 10 there is shown a pipe base having a plurality of holes extending there through, throughout the circumference thereof. A plurality of support rods reside on the base and have a wire wrap helically wound thereabout throughout the length of the screen, or through any portion of the length thereof. A sealant is disposed exteriorly of the wire wrap throughout substantially one-half ($\frac{1}{2}$) the circumference on the upper portion thereof.

The inventive concept described above thus readily presents a screen which may be composed of varying structural components in which there is characteristically present an upper portion extending through one hundred and eighty degrees (180°) of the circumference, more or less, which is solid in design, namely an upper portion which is impervious to fluid/sand flow, thereby resulting in movement by gravity of the sand to the lower portion of the screen structure. All such screens as are here shown are exemplary only of the screens and screen structure to which the present invention may be applied. These structures may be chosen in varying combinations to perform a desired screening result. Whether there exists a solid pipe body with holes extending there throughout around the circumference or through only a portion thereof or whether there exists a helically wound wire screen adjacent thereto is incidental to the concept disclosed herein, namely the design and utilization of a solid screen section, generally on the upper portion of a screen disposed in substantially horizontal or shallow disposition so as to enhance gravitational flow to the lower portion of the screen where the screening function itself takes place.

Thus while this invention has been described through the use of a plurality of embodiments here shown, it will be readily recognized by those skilled in this art that these illustrations are for exemplary purposes only and that the invented concept so illustrated may be practiced in screen forms other than those here shown provided that such uses and applications are within the scope of the claims appended hereto.

Therefore, that which is desired to be secured by United States Letters Patent is:

What is claimed is:

1. A gravity enhanced maintenance screen for use in shallow angle wells characterized by a low flow velocity generally insufficient to transport sand upwardly against the force of gravity comprising:

a tubular member characterized by a circular cross-sectional configuration in which there exists a first portion and a second portion, each said of first and second portions standing substantially one hundred eighty degrees (180°), more or less, about said circular cross-section, a first of said portions being characterized by permeability to fluids, said first portion being positioned generally downwardly, a second of said portions characterized by its impermeability to fluids, said second portion being positioned generally upwardly so that sand and fluid will, by natural force, gravitate downward toward said first portion.

2. The gravity enhanced maintenance screen of claim 1 for use in shallow angle wells having low flow velocity insufficient to transport sand upwardly against the force of gravity, wherein said tubular member comprises a solid section of pipe and wherein each of said first and second portions has a plurality of holes extending from the interior of the tubular member to the exterior thereof, said holes being selectively sized and positioned along the length of said tubular member, and, wherein said screen further comprises a covering means extending about said first portion in intimate contact therewith for obstructing passage of sand and fluid through said holes adjacent thereto.

3. The gravity enhanced maintenance screen of claim 2 wherein said covering means consists of a plate disposed on the surface of said second portion of said tubular member.

4. The gravity enhanced maintenance screen of claim 2 wherein said covering means consists of a sealant disposed on the surface of said second portion of said tubular member.

5. The gravity enhanced maintenance screen of claim 1 for use in shallow angle wells having low flow velocity insufficient to transport sand upwardly against the force of gravity, wherein said first portion consists of a screen means and wherein said second portion is a solid surface substantially precluding the movement of sand and/or fluid therethrough.

6. The gravity enhanced maintenance screen of claim 5 wherein said screen means is characterized by a plurality of rods disposed in parallel fashion to one another along the length of said screen, a wire wrap structure disposed on said support rods for performing a screening function, said wire wrap structure and support rods integrally connected to said solid surface to thereby form said tubular member.

7. The gravity enhanced maintenance screen of claim 1 for use in shallow angle wells having low flow velocity insufficient to transport sand upwardly the force of gravity wherein said tubular member consists of elongate support rods disposed in a circular pattern, each parallel to the others and extending longitudinally in said tubular member, a wire wrapped screen disposed on said support rods and being helically wound thereabout, and, a plate means disposed in covering relation to said second portion so as to preclude the movement of sand or fluid therethrough.

8. The gravity enhanced maintenance screen of claim 7 wherein said plate means comprises a sealant disposed on the surface of said second portion of said tubular member.

9. The gravity enhanced maintenance screen of claim 1 for use in shallow angle wells having low flow velocity insufficient to transport sand upwardly against the force of gravity, wherein said tubular member comprises a solid section of pipe and wherein said first portion of said tubular member is characterized by a plurality of holes extending from the interior of said tubular member to the exterior thereof, said holes being selectively positioned at pre-determined distances from one another along the length of said tubular member and wherein said second portion of said tubular member is solid so that neither sand nor fluid may pass therethrough.

10. The gravity enhanced maintenance screen of claim 1 for use in shallow angle wells having low flow velocity characteristics in which the velocity is insufficient to transport sand upwardly against the force of gravity wherein said tubular member comprises a pipe, said pipe being characterized by a plurality of holes selectively disposed therein, and a plurality of elongate rods disposed in parallel fashion to one another about the pipe and extending along the length thereof, and a wire wrap helically disposed about the elongate rods, said gravity enhanced maintenance screen further comprising a covering means disposed in adjacent relation to said second portion for precluding the movement of fluid and sand through said second portion of the screen.

* * * * *